United States Patent
Keith, Jr.

(10) Patent No.: US 9,317,506 B2
(45) Date of Patent: Apr. 19, 2016

(54) ACCELERATED DATA TRANSFER USING COMMON PRIOR DATA SEGMENTS

(75) Inventor: Robert O. Keith, Jr., Modesto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 560 days.

(21) Appl. No.: 11/525,729

(22) Filed: Sep. 22, 2006

(65) Prior Publication Data
US 2008/0077630 A1  Mar. 27, 2008

(51) Int. Cl.
*G06F 17/30* (2006.01)

(52) U.S. Cl.
CPC .................. *G06F 17/30067* (2013.01)

(58) Field of Classification Search
USPC .................................. 707/699, 747
See application file for complete search history.

(56) References Cited

U.S. PATENT DOCUMENTS

| | | | |
|---|---|---|---|
| 4,866,635 A | 9/1989 | Kahn et al. ................... 364/513 |
| 5,204,897 A | 4/1993 | Wyman | |
| 5,479,654 A * | 12/1995 | Squibb .............. G06F 17/30067 707/695 |
| 5,602,990 A | 2/1997 | Leete ........................ 395/183.22 |
| 5,649,196 A * | 7/1997 | Woodhill ............ G06F 11/1451 707/999.009 |
| 5,659,743 A | 8/1997 | Adams et al. .................. 395/621 |
| 5,787,409 A | 7/1998 | Seiffert et al. | |
| 5,802,364 A | 9/1998 | Senator et al. | |
| 5,812,751 A | 9/1998 | Ekrot et al. | |
| 5,835,911 A | 11/1998 | Nakagawa et al. | |
| 5,897,635 A | 4/1999 | Torres et al. | |
| 5,930,357 A | 7/1999 | Fukui | |
| 5,933,647 A | 8/1999 | Aronberg et al. | |
| 5,950,010 A | 9/1999 | Hesse et al. | |
| 5,974,547 A | 10/1999 | Klimenko ......................... 713/2 |
| 6,012,152 A | 1/2000 | Douik et al. .................... 714/26 |
| 6,029,196 A | 2/2000 | Lenz ............................. 709/221 |
| 6,067,582 A | 5/2000 | Smith et al. | |

(Continued)

FOREIGN PATENT DOCUMENTS

WO  WO2005119493 A2  12/2005
WO  WO2005119494 A2  12/2005

(Continued)

OTHER PUBLICATIONS http://www.macrovision.com/products/flexnet_installshield/installshield/overview/index.shtml, pp. 1-3.

(Continued)

*Primary Examiner* — Kim Nguyen
(74) *Attorney, Agent, or Firm* — Thomas Wong; Doug Barker; Micky Minhas

(57) ABSTRACT

Accelerating data transfers is described herein. When a second computing system is requested to transfer a file to a first computing system, a data segment is sent to the first computing system instead of the entire file. The data segment is then compared to data stored within a data store on the first computing system. If the data segment and data within the data store match, then the file does not need to be transferred, and a pointer points to the file already located on the first computing system. If the data segment does not match any data stored in the data store, then the file is transferred from the second computing system to the first computing system. By comparing only the data segment instead of sending an entire file, data transfer is able to be greatly expedited in situations where the data is common between systems.

52 Claims, 4 Drawing Sheets

(56) References Cited

U.S. PATENT DOCUMENTS

| | | | |
|---|---|---|---|
| 6,144,959 A | 11/2000 | Anderson et al. | |
| 6,170,065 B1 | 1/2001 | Kobata et al. | 714/7 |
| 6,189,101 B1 | 2/2001 | Dusenbury, Jr. | |
| 6,209,089 B1 | 3/2001 | Selitrennikoff et al. | 713/2 |
| 6,212,525 B1* | 4/2001 | Guha | G06F 17/30949 707/747 |
| 6,212,660 B1 | 4/2001 | Joeressen et al. | 714/758 |
| 6,282,711 B1 | 8/2001 | Halpern et al. | |
| 6,301,612 B1 | 10/2001 | Selitrennikoff et al. | 709/220 |
| 6,314,428 B1 | 11/2001 | Brew et al. | |
| 6,317,761 B1 | 11/2001 | Landsman et al. | 707/513 |
| 6,339,826 B2 | 1/2002 | Hayes, Jr. et al. | |
| 6,349,137 B1 | 2/2002 | Hunt et al. | |
| 6,356,915 B1 | 3/2002 | Chtchetkine et al. | 707/200 |
| 6,363,400 B1 | 3/2002 | Chtchetkine et al. | 707/200 |
| 6,366,296 B1 | 4/2002 | Boreczky et al. | 345/719 |
| 6,378,035 B1 | 4/2002 | Parry et al. | 711/110 |
| 6,421,777 B1 | 7/2002 | Pierre-Louis et al. | 713/2 |
| 6,449,658 B1 | 9/2002 | Lafe et al. | 709/247 |
| 6,459,499 B1 | 10/2002 | Tomat | |
| 6,463,530 B1 | 10/2002 | Sposato | 713/2 |
| 6,473,794 B1 | 10/2002 | Guheen et al. | 709/223 |
| 6,477,531 B1 | 11/2002 | Sullivan et al. | 707/10 |
| 6,490,677 B1 | 12/2002 | Aquilar et al. | 713/1 |
| 6,536,037 B1 | 3/2003 | Guheen et al. | 717/151 |
| 6,553,375 B1 | 4/2003 | Huang et al. | |
| 6,556,950 B1 | 4/2003 | Schwenke et al. | 702/183 |
| 6,578,142 B1 | 6/2003 | Anderson et al. | |
| 6,606,744 B1 | 8/2003 | Mikurak | 717/174 |
| 6,625,651 B1 | 9/2003 | Swartz et al. | |
| 6,625,754 B1 | 9/2003 | Aguilar et al. | |
| 6,633,782 B1 | 10/2003 | Schleiss et al. | |
| 6,636,857 B2 | 10/2003 | Thomas et al. | 707/10 |
| 6,654,797 B1 | 11/2003 | Kamper | 709/220 |
| 6,654,801 B2 | 11/2003 | Mann et al. | |
| 6,694,375 B1 | 2/2004 | Beddus et al. | 709/249 |
| 6,697,852 B1 | 2/2004 | Ryu | |
| 6,704,886 B1 | 3/2004 | Gill et al. | |
| 6,718,464 B2 | 4/2004 | Cromer et al. | 713/2 |
| 6,728,530 B1 | 4/2004 | Heinonen et al. | |
| 6,735,625 B1 | 5/2004 | Ponna | 709/223 |
| 6,751,658 B1 | 6/2004 | Haun et al. | 709/222 |
| 6,757,729 B1 | 6/2004 | Devarakonda et al. | |
| 6,795,912 B1 | 9/2004 | Itoh et al. | |
| 6,816,462 B1 | 11/2004 | Booth, III et al. | 370/248 |
| 6,816,882 B1 | 11/2004 | Conner et al. | |
| 6,820,180 B2 | 11/2004 | McBrearty et al. | |
| 6,854,009 B1 | 2/2005 | Hughes | |
| 6,871,210 B1 | 3/2005 | Subramanian | 709/203 |
| 6,880,108 B1 | 4/2005 | Gusler et al. | |
| 6,885,481 B1 | 4/2005 | Dawe | |
| 6,886,020 B1 | 4/2005 | Zahavi et al. | 707/204 |
| 6,898,286 B2 | 5/2005 | Murray | |
| 6,915,343 B1 | 7/2005 | Brewer et al. | 709/224 |
| 6,954,853 B2 | 10/2005 | Wang et al. | |
| 6,954,930 B2 | 10/2005 | Drake et al. | |
| 6,959,235 B1 | 10/2005 | Abdel-Malek et al. | |
| 6,985,967 B1 | 1/2006 | Hipp | |
| 7,003,560 B1 | 2/2006 | Mullen et al. | |
| 7,003,663 B2 | 2/2006 | Lagosanto et al. | |
| 7,024,471 B2 | 4/2006 | George et al. | |
| 7,058,698 B2 | 6/2006 | Chatterjee et al. | |
| 7,080,118 B2 | 7/2006 | Hildebrand | |
| 7,143,307 B1 | 11/2006 | Witte et al. | |
| 7,149,698 B2 | 12/2006 | Guheen et al. | |
| 7,165,087 B1 | 1/2007 | Graupner et al. | |
| 7,175,078 B2 | 2/2007 | Ban et al. | |
| 7,178,166 B1 | 2/2007 | Taylor et al. | |
| 7,194,445 B2 | 3/2007 | Chan et al. | |
| 7,200,779 B1 | 4/2007 | Coss, Jr. et al. | |
| 7,210,143 B2 | 4/2007 | Or et al. | |
| 7,237,122 B2 | 6/2007 | Kadam et al. | |
| 7,260,597 B1 | 8/2007 | Hofrichter et al. | |
| 7,287,053 B2 | 10/2007 | Bodin | |
| 7,305,671 B2 | 12/2007 | Davidov et al. | |
| 7,328,367 B2 | 2/2008 | Ukai et al. | |
| 7,330,997 B1 | 2/2008 | Odom | |
| 7,337,311 B2 | 2/2008 | Chen et al. | |
| 7,392,046 B2 | 6/2008 | Leib et al. | |
| 7,401,125 B1 | 7/2008 | Uchida et al. | |
| 7,480,822 B1 | 1/2009 | Arbon et al. | |
| 7,487,383 B2 | 2/2009 | Bensinger | |
| 7,512,584 B2 | 3/2009 | Keith, Jr. | |
| 7,571,467 B1 | 8/2009 | Priestley et al. | |
| 7,577,431 B2 | 8/2009 | Jiang | |
| 7,624,086 B2 | 11/2009 | Keith, Jr. | |
| 7,627,694 B2 | 12/2009 | Sreenivasan et al. | |
| 7,664,834 B2 | 2/2010 | Keith, Jr. | |
| 7,698,487 B2 | 4/2010 | Rothman et al. | |
| 7,703,142 B1 | 4/2010 | Wilson et al. | |
| 7,752,486 B2 | 7/2010 | Satran et al. | |
| 7,788,524 B2 | 8/2010 | Wing et al. | |
| 7,840,514 B2 | 11/2010 | Keith, Jr. | |
| 7,844,686 B1 | 11/2010 | Keith, Jr. | |
| 7,886,031 B1 | 2/2011 | Taylor et al. | |
| 7,908,339 B2 | 3/2011 | Keith, Jr. | |
| 7,912,902 B2 | 3/2011 | Cheng et al. | |
| 8,099,378 B2 | 1/2012 | Keith, Jr. | |
| 8,126,722 B2 | 2/2012 | Robb et al. | |
| 8,175,418 B1 | 5/2012 | Keith, Jr. | |
| 8,234,238 B2 | 7/2012 | Keith, Jr. | |
| 8,244,864 B1 | 8/2012 | Bahl et al. | |
| 8,307,239 B1 | 11/2012 | Keith, Jr. | |
| 8,423,821 B1 | 4/2013 | Keith, Jr. | |
| 8,612,741 B2 | 12/2013 | Crisan et al. | |
| 2001/0037323 A1 | 11/2001 | Moulton et al. | 707/1 |
| 2001/0049793 A1 | 12/2001 | Sugimoto | 713/200 |
| 2002/0013827 A1 | 1/2002 | Edstrom et al. | |
| 2002/0035674 A1 | 3/2002 | Vetrivelkumaran et al. | |
| 2002/0049764 A1* | 4/2002 | Boothby | G06F 17/30067 |
| 2002/0059505 A1 | 5/2002 | St. Pierre et al. | |
| 2002/0083183 A1 | 6/2002 | Pujare et al. | |
| 2002/0087625 A1 | 7/2002 | Toll et al. | |
| 2002/0087963 A1 | 7/2002 | Eylon et al. | |
| 2002/0091763 A1 | 7/2002 | Shah et al. | |
| 2002/0094868 A1 | 7/2002 | Tuck et al. | |
| 2002/0099934 A1 | 7/2002 | Cromer et al. | |
| 2002/0104080 A1 | 8/2002 | Woodard et al. | |
| 2002/0107920 A1 | 8/2002 | Hotti | |
| 2002/0107945 A1 | 8/2002 | George et al. | |
| 2002/0116585 A1 | 8/2002 | Scherr | 711/133 |
| 2002/0124092 A1 | 9/2002 | Urien | 709/229 |
| 2002/0131404 A1 | 9/2002 | Mehta et al. | |
| 2002/0138640 A1 | 9/2002 | Raz et al. | |
| 2002/0157089 A1 | 10/2002 | Patel et al. | |
| 2002/0161868 A1 | 10/2002 | Paul et al. | 709/221 |
| 2002/0188941 A1 | 12/2002 | Cicciarelli et al. | |
| 2003/0005096 A1 | 1/2003 | Paul et al. | 709/222 |
| 2003/0014470 A1 | 1/2003 | Iijima | |
| 2003/0031164 A1 | 2/2003 | Nabkel et al. | |
| 2003/0033379 A1 | 2/2003 | Civanlar et al. | 709/218 |
| 2003/0036882 A1 | 2/2003 | Harper et al. | |
| 2003/0037328 A1 | 2/2003 | Cicciarelli et al. | |
| 2003/0041136 A1 | 2/2003 | Cheline et al. | 709/223 |
| 2003/0046371 A1 | 3/2003 | Falkner | |
| 2003/0051128 A1 | 3/2003 | Rodriguez et al. | 713/100 |
| 2003/0055878 A1 | 3/2003 | Fletcher et al. | |
| 2003/0061067 A1 | 3/2003 | Atwal et al. | |
| 2003/0078960 A1 | 4/2003 | Murren et al. | |
| 2003/0110188 A1 | 6/2003 | Howard et al. | |
| 2003/0120502 A1 | 6/2003 | Robb et al. | |
| 2003/0126242 A1 | 7/2003 | Chang | 709/222 |
| 2003/0177381 A1 | 9/2003 | Ofek et al. | |
| 2003/0191730 A1 | 10/2003 | Adkins et al. | |
| 2003/0204562 A1 | 10/2003 | Hwang | |
| 2003/0233383 A1 | 12/2003 | Koskimies | |
| 2003/0233493 A1 | 12/2003 | Boldon et al. | |
| 2004/0010716 A1 | 1/2004 | Childress et al. | |
| 2004/0025018 A1 | 2/2004 | Haas et al. | |
| 2004/0068554 A1 | 4/2004 | Bales et al. | |
| 2004/0073787 A1 | 4/2004 | Ban et al. | |
| 2004/0093492 A1 | 5/2004 | Daude et al. | 713/156 |
| 2004/0098426 A1 | 5/2004 | Ishii et al. | |
| 2004/0104927 A1 | 6/2004 | Husain et al. | |

(56) References Cited

U.S. PATENT DOCUMENTS

| | | |
|---|---|---|
| 2004/0107273 A1 | 6/2004 | Biran et al. |
| 2004/0123153 A1 | 6/2004 | Wright et al. ............... 713/201 |
| 2004/0133634 A1* | 7/2004 | Luke ............... G06F 11/2089 709/203 |
| 2004/0148306 A1 | 7/2004 | Moulton et al. ............ 707/101 |
| 2004/0180721 A1 | 9/2004 | Rowe |
| 2004/0193876 A1 | 9/2004 | Donley et al. |
| 2004/0201604 A1 | 10/2004 | Kraenzel et al. ............ 345/700 |
| 2004/0236843 A1 | 11/2004 | Wing et al. ............... 709/219 |
| 2004/0243650 A1 | 12/2004 | McCrory et al. |
| 2004/0243928 A1 | 12/2004 | Hesmer et al. |
| 2004/0267944 A1 | 12/2004 | Britt, Jr. |
| 2005/0027846 A1 | 2/2005 | Wolfe et al. |
| 2005/0033757 A1 | 2/2005 | Greenblatt et al. |
| 2005/0033808 A1 | 2/2005 | Cheng et al. |
| 2005/0044197 A1 | 2/2005 | Lai |
| 2005/0044332 A1 | 2/2005 | de Brebisson |
| 2005/0044544 A1 | 2/2005 | Slivka et al. |
| 2005/0060281 A1 | 3/2005 | Bucher et al. |
| 2005/0071267 A1 | 3/2005 | Takahashi et al. |
| 2005/0096920 A1 | 5/2005 | Matz et al. |
| 2005/0108297 A1 | 5/2005 | Rollin et al. |
| 2005/0108538 A1* | 5/2005 | Howard ............ G11B 20/00086 713/176 |
| 2005/0108546 A1 | 5/2005 | Lehew et al. |
| 2005/0108593 A1 | 5/2005 | Purushothaman et al. |
| 2005/0144218 A1 | 6/2005 | Heintz ............... 709/202 |
| 2005/0149729 A1 | 7/2005 | Zimmer et al. ............ 713/168 |
| 2005/0160289 A1 | 7/2005 | Shay |
| 2005/0188315 A1 | 8/2005 | Campbell et al. |
| 2005/0192035 A1 | 9/2005 | Jiang |
| 2005/0193245 A1 | 9/2005 | Hayden et al. |
| 2005/0198196 A1 | 9/2005 | Bohn et al. |
| 2005/0198239 A1 | 9/2005 | Hughes |
| 2005/0216524 A1 | 9/2005 | Gomes et al. |
| 2005/0216902 A1 | 9/2005 | Schaefer |
| 2005/0226059 A1 | 10/2005 | Kavuri et al. |
| 2005/0256952 A1 | 11/2005 | Mouhanna et al. |
| 2005/0262503 A1 | 11/2005 | Kane |
| 2005/0268145 A1 | 12/2005 | Hufferd et al. |
| 2005/0273486 A1 | 12/2005 | Keith, Jr. |
| 2005/0283606 A1 | 12/2005 | Williams ............... 713/166 |
| 2005/0286435 A1 | 12/2005 | Ogawa et al. |
| 2006/0021040 A1 | 1/2006 | Boulanger et al. ............ 726/23 |
| 2006/0031377 A1 | 2/2006 | Ng et al. |
| 2006/0031407 A1 | 2/2006 | Dispensa et al. |
| 2006/0031529 A1 | 2/2006 | Keith, Jr. |
| 2006/0035713 A1 | 2/2006 | Cockerille et al. |
| 2006/0041641 A1 | 2/2006 | Breiter et al. |
| 2006/0041759 A1 | 2/2006 | Kaliski, Jr. et al. |
| 2006/0047716 A1 | 3/2006 | Keith, Jr. |
| 2006/0047946 A1 | 3/2006 | Keith, Jr. |
| 2006/0059384 A1 | 3/2006 | Helliker |
| 2006/0074943 A1 | 4/2006 | Nakano et al. |
| 2006/0095705 A1 | 5/2006 | Wichelman et al. .......... 711/171 |
| 2006/0106842 A1 | 5/2006 | Diament et al. |
| 2006/0106896 A1 | 5/2006 | Carlson et al. |
| 2006/0129459 A1 | 6/2006 | Mendelsohn |
| 2006/0143709 A1 | 6/2006 | Brooks et al. ............... 726/23 |
| 2006/0149955 A1 | 7/2006 | Velhal et al. |
| 2006/0179061 A1 | 8/2006 | D'Souza et al. |
| 2006/0200736 A1* | 9/2006 | Smit ............... H04L 29/06027 715/203 |
| 2006/0224544 A1 | 10/2006 | Keith, Jr. |
| 2006/0224545 A1 | 10/2006 | Keith, Jr. |
| 2006/0233310 A1 | 10/2006 | Adams, Jr. et al. |
| 2007/0011292 A1 | 1/2007 | Fritsch et al. |
| 2007/0078982 A1 | 4/2007 | Aidun et al. |
| 2007/0094269 A1 | 4/2007 | Mikesell et al. |
| 2007/0143374 A1 | 6/2007 | D'Souza et al. |
| 2007/0174658 A1 | 7/2007 | Takamoto et al. |
| 2007/0174690 A1 | 7/2007 | Kambara et al. |
| 2007/0185936 A1 | 8/2007 | Derk et al. |
| 2007/0233633 A1 | 10/2007 | Keith, Jr. |
| 2007/0239905 A1* | 10/2007 | Banerjee ............... H04L 49/90 710/22 |
| 2007/0255604 A1 | 11/2007 | Seelig |
| 2007/0271290 A1 | 11/2007 | Keith, Jr. ............... 707/101 |
| 2007/0271428 A1 | 11/2007 | Atluri |
| 2007/0274315 A1 | 11/2007 | Keith, Jr. |
| 2007/0276836 A1 | 11/2007 | Chatterjee et al. |
| 2008/0016387 A1 | 1/2008 | Bensinger |
| 2008/0034019 A1 | 2/2008 | Cisler et al. |
| 2008/0034071 A1 | 2/2008 | Wilkinson et al. |
| 2008/0072002 A1 | 3/2008 | Kuwahara et al. |
| 2008/0077622 A1 | 3/2008 | Keith, Jr. |
| 2008/0077630 A1* | 3/2008 | Keith ............... G06F 17/30067 |
| 2008/0090560 A1 | 4/2008 | Bouzid et al. |
| 2008/0127294 A1 | 5/2008 | Keith, Jr. |
| 2008/0209142 A1 | 8/2008 | Obernuefemann |
| 2008/0216168 A1 | 9/2008 | Larson et al. |
| 2008/0294860 A1 | 11/2008 | Stakutis et al. |
| 2008/0313632 A1 | 12/2008 | Kumar et al. |
| 2009/0075593 A1 | 3/2009 | Demirbasa et al. |
| 2009/0094362 A1 | 4/2009 | Huff |
| 2010/0050011 A1 | 2/2010 | Takamoto et al. |
| 2010/0125770 A1 | 5/2010 | Keith, Jr. |
| 2011/0047118 A1 | 2/2011 | Keith, Jr. |
| 2011/0161729 A1 | 6/2011 | Ritz et al. |
| 2012/0084364 A1 | 4/2012 | Sivavakeesar |
| 2012/0198154 A1 | 8/2012 | Keith, Jr. |
| 2012/0272099 A1 | 10/2012 | Keith, Jr. |
| 2013/0031405 A1 | 1/2013 | Keith, Jr. |

FOREIGN PATENT DOCUMENTS

| | | |
|---|---|---|
| WO | WO2005119495 A2 | 12/2005 |
| WO | WO2006010131 A2 | 1/2006 |
| WO | WO2006094282 A2 | 9/2006 |
| WO | WO2006094301 A2 | 9/2006 |
| WO | WO2007139962 A2 | 12/2007 |
| WO | WO2007139963 A2 | 12/2007 |
| WO | WO2008039386 A2 | 4/2008 |
| WO | WO2008039394 A2 | 4/2008 |
| WO | WO2008039395 A2 | 4/2008 |

OTHER PUBLICATIONS http://macrovision.com/products/flexnet_installshield/installshield/index.shtml, pp. 1-2.
http://www.stealthbits.com/, pp. 1-2.
http://www.microsoft.com/technet/prodtechnol/windows2000serv/maintain/featusability/inmnwp.mspx, pp. 1-36.
http://en.wikipedia.org/wik/Expert_system, pp. 1-9.
http://www.pctools.com/registry-mechanic/, pp. 1-2.
http://www.backup.com.
http://www.swapdrive.com/sdbackup.asp.
Bandwidth Capping at Source http://www.24onlinebilling.com/download/whitepapers/Bandwidth%20Capping%20At%20Source.pdf pp. 1-9.
IBM Corporation, AFS: "User Guide", First Edition, Version 3.6. Apr. 2000, pp. 112.
Shepler et al. "RFC 3530—Network File System (NFS) version 4 Protocol", Standards Track, Apr. 2003, pp. 278, http://tools.ietf.org/html/rfc3530#page-119.
IEEE100 the Authoritative Dictionary of IEEE Standards Terms, Seventh Edition, Jan. 2003, 3 pages.
VMware, VMware Infrastructure Architecture Overview, Jun. 14, 2006, http:/www.vmware.com/resourse/techresources/, pp. 1-14.
VMware, Using VMware Infrastructure for Backup and Restore, Oct. 26, 2006, http:/www.vmware.com/resourse/techresources/, pp. 1-20.
Microsoft@ Computer Dictionary, Fifth Edition, 2002, 3 pages.
Tridgell, A., "Efficient Algorithms for Sorting and Synchronization," Thesis, The Australian National University, Feb. 1999, 106 pages.
MacDonald, J.P., "File System Support for Delta Compression," University of California at Berkeley, Dept. of Electrical Engineering and Computer Sciences, May 19, 2000, 32 pages.

(56) References Cited

OTHER PUBLICATIONS

Muthitacharoen et al., "A Low-bandwidth Network File System," MIT Laboratory for Computer Science and NYU Department of Computer Science, 2001, 14 pages.

Yu et al., "Scalable network resource management for large scale Virtual Private Networks," Simulation Modeling Practice and Theory, 12 (2004) pp. 263-285.

Cisco PIX "Configuring an IPSec Tunnel Between a Cisco Secure PIX Firewall and a Checkpoint NG Firewall," May 12, 2006, document ID 23785.

Random House Unabridged Dictionary, "device: meaning and definitions," 1997, Random House Inc., retrieved via "http://dictionary.infoplease.com/device".

Microsoft Press, Microsoft® Computer Dictionary, Fifth Edition, May 1, 2002, p. 39.

Definition of Plug-in (computing) from http://en.wikipedia.org/wiki/Plug-in_(computing), printed on Jun. 18, 2011, 1 page.

Plug-in definition from Wikipedia, http://en.wikipedia.org/wiki/Plug-in_(computing) printed Nov. 6, 2011, 5 pages.

* cited by examiner

ACCELERATED DATA TRANSFER USING COMMON PRIOR DATA SEGMENTS

FIELD OF THE INVENTION

The present invention relates to the field of data transfers. More specifically, the present invention relates to the field of transferring data using common prior data segments.

BACKGROUND OF THE INVENTION

As networking technologies grow, including the Internet, so do their capabilities and requirements. For many years, users dialed up to access the Internet at speeds of 14.4 kilobits per second (kps), then 28.8 kps and 56.6 kps. Then ISDN lines made 128 kps a possibility. Currently cable modems and DSL provide extremely fast connections with high bandwidth to home users. Other technologies such as T1 and T3 lines provide possibly even faster connections and are usually implemented by businesses and universities. As these technologies are increasing in capabilities, so too is the size and amount of the data traveling from one networked device to another. For example, when 14.4 kps connections were prominent, a file of a few hundred kilobytes was considered quite large and took a while to download. With current broadband technologies utilizing cable modems and DSL, a file of multiple megabytes is able to be downloaded in a few minutes. Hence, technology has improved substantially, enabling larger files to be downloaded in a short amount of time. However, many data files are currently in the range of gigabytes such as movie files which could take hours to download even on fast connections and would take days with older dial-up connections. Since the Internet and other networks are being used to couple everything together lately, even toasters and refrigerators, many attempts have been made to make network connections more efficient utilizing data processing techniques.

One technique is to compress the data before sending it over the network. However, that has its drawbacks of adding steps of compressing the data and before it is sent and uncompressing the data after it is received, simply adding time to the process in a different way. Furthermore, since many files like .mp3s are already compressed yet still quite large, compressing them again will do little if anything to improve network speed.

Another technique is described in U.S. Patent App. No. 2004/0148306 to Moulton, et al. Moulton describes a hash file system that is based and organized upon hashes and which is able to eliminate redundant copies of aggregate blocks of data or parts of data blocks from the system. The hash file system taught by Moulton utilizes hash values for computer files or file pieces which are produced by a checksum generating program, engine or algorithm. The hash file system as taught by Moulton is able to be used as a network accelerator by sending hashes for the data instead of the data itself.

SUMMARY OF THE INVENTION

Accelerating data transfers is described herein. When a second computing system is requested to transfer a file to a first computing system, a data segment is sent to the first computing system instead of the entire file. The data segment is then compared to data stored within a data store on the first computing system. If the data segment and data within the data store match, then the file does not need to be transferred, and a pointer points to the file already located on the first computing system. If the data segment does not match any data stored in the data store, then the file is transferred from the second computing system to the first computing system. By comparing only the data segment instead of sending an entire file, data transfer is able to be greatly expedited in situations where the data is common between systems.

In one aspect, a method of accelerating data transfer comprises storing data in a data store on a first computing system wherein the data corresponds to one or more files stored on the first computing system, transferring a data segment from a source file from a second computing system to the first computing system over a network, scanning the data store for the data segment, generating one or more pointers to the one or more corresponding files of one or more matching data segments, if the one or more matching data segments are identified in the data store and transferring a copy of the source file, if the one or more matching data segments are not identified in the data store. The data store is a database. The first computing system is a target system and the second computing system is a source system. The first computing system is a server and the second computing system is a client system. The client system is selected from the group consisting of a personal computer, a PDA, a cell phone, a laptop, a thin client, a Mac computer, an mp3 player and a gaming console. Alternatively, the first computing system is a first client system and the second computing system is a second client system. The data segment is one or more cyclic redundancy checks and the data in the data store includes cyclic redundancy checks and the data segment and the data are compared. Alternatively, the data segment is a unique database key and the data in the data store includes database keys and the data segment and the data are compared. Alternatively, the data segment is a hash and the data in the data store includes hashes and the data segment and the data are compared. The data store grows as more files are stored on the first computing system. The files stored on the first computing system are minimized by implementing the data store. One or more additional computing systems are coupled to the first computing system. The method further comprises transferring only a first section of the source file when only a second section of the source file is found within the data store. A standard operating system and file system are utilized on the first computing system and the second computing system.

In another aspect, a system for accelerating data transfer comprises a first computing system for storing one or more files and a data store for storing data corresponding to the one or more files and a second computing system coupled to the first computing system, wherein a data segment is compared to the data within the data store on the first computing system after being received from the second computing system, further wherein a pointer to the one or more files is added on the first computing system if the data segment is found within the data store, but a copy of a source file corresponding to the data segment is transferred from the second computing system to the first computing system if the data segment is not found in the data store. The data store is a database. The first computing system is a target system and the second computing system is a source system. The first computing system is a server and the second computing system is a client system. The client system is selected from the group consisting of a personal computer, a PDA, a cell phone, a laptop, a thin client, a Mac computer, an mp3 player and a gaming console. Alternatively, the first computing system is a first client system and the second computing system is a second client system. The data segment is one or more cyclic redundancy checks and the data in the data store includes cyclic redundancy checks and the data segment and the data are compared. Alternatively, the data segment is a unique database key and the data in the data store includes database keys and the data segment and the data are compared. Alternatively, the data segment is a hash and the data in the data store includes hashes and the data segment and the data are compared. The data store grows as more files are stored on the first computing system. The files stored on the first computing system are minimized by implementing the data store. The system further comprises one or more additional computing systems coupled to the first computing system. Only a first section of the source file is transferred when only a second section of the source file is found within the data store. A standard operating system and file system are utilized on the first computing system and the second computing system. The system further comprises a network coupling the first computing system and the second computing system.

In another aspect, a network of systems for accelerating data transfers comprises one or more source systems for transferring a data segment corresponding to a source file stored on the one or more source systems, one or more target systems coupled to the one or more source systems for storing data in a data store corresponding to one or more files and for comparing the data segment received from the one or more source systems with the data in the data store where if the data segment is found, a pointer is generated to point to a corresponding file in the one or more files on the target system instead of transferring the source file over a network. The data store is a database. The one or more target systems are one or more servers and the one or more source systems are one or more client systems. The one or more client systems are selected from the group consisting of personal computers, PDAs, cell phones, laptops, thin clients, Mac computers, mp3 players and gaining consoles. The data segment is one or more cyclic redundancy checks and the data in the data store includes cyclic redundancy checks and the data segment and the data are compared. Alternatively, the data segment is a unique database key and the data in the data store includes database keys and the data segment and the data are compared. Alternatively, the data segment is a hash and the data in the data store includes hashes and the data segment and the data are compared. The data store grows as more files are stored on the one or more target systems. The files stored on the one or more target systems are minimized by implementing the data store. Only a first section of the source file is transferred when only a second section of the source file is found within the data store. A standard operating system and file system are utilized on the one or more target systems and the one or more source systems.

In yet another aspect, a storage system configured to receive data from a plurality of computing systems comprises one or more files, a set of information corresponding to the one or more files and a data store for storing the set of information, wherein a data segment received from a source system is compared with the set of information stored within the data store and a pointer is generated to point to a corresponding file in the one or more files if the data segment is found but if the data segment is not found within the data store, a copy of a source file corresponding to the data segment is transferred. The data store is a database. The data segment is one or more cyclic redundancy checks and the set of information in the data store includes cyclic redundancy checks and the data segment and the set of information are compared. Alternatively, the data segment is a unique database key and the set of information in the data store includes database keys and the data segment and the set of information are compared. Alternatively, the data segment is a hash and the set of information in the data store includes hashes and the data segment and the set of information are compared. The data store grows as more files are stored on the storage system. The files stored on the storage system are minimized by implementing the data store. Only a first section of the source file is transferred when only a second section of the source file is found within the data store. A standard operating system and file system are utilized on the storage system.

DETAILED DESCRIPTION OF THE PREFERRED EMBODIMENT

A system for and method of accelerating data transfers over a network is described herein. In the past, data was transferred with a minimal check to determine if the data is already located on the destination system. Essentially, a check was made whether a file with the same file name is located in the location of the desired destination. For example, if a user was copying movie.avi from his personal computer to a folder entitled "comedy" on a backup server used for people to store their movies, the server only checks if movie.avi exists in the "comedy" folder. However, there are a number of problems with this. The main one is that the file movie.avi could already be located on the server just in a different folder. It would be a waste of network resources to copy the entire movie.avi file, considering a typical movie file is a few hundred megabytes or possibly gigabytes. Using the present invention, only a data segment is sent from the user's computer to the server, and then the server searches its system and locates the preexisting movie.avi and simply generates a pointer to it. Thus, only a very small amount of data is sent over the network instead of a huge movie file, and each file is only stored a single time on the storage system.

Figure 1:
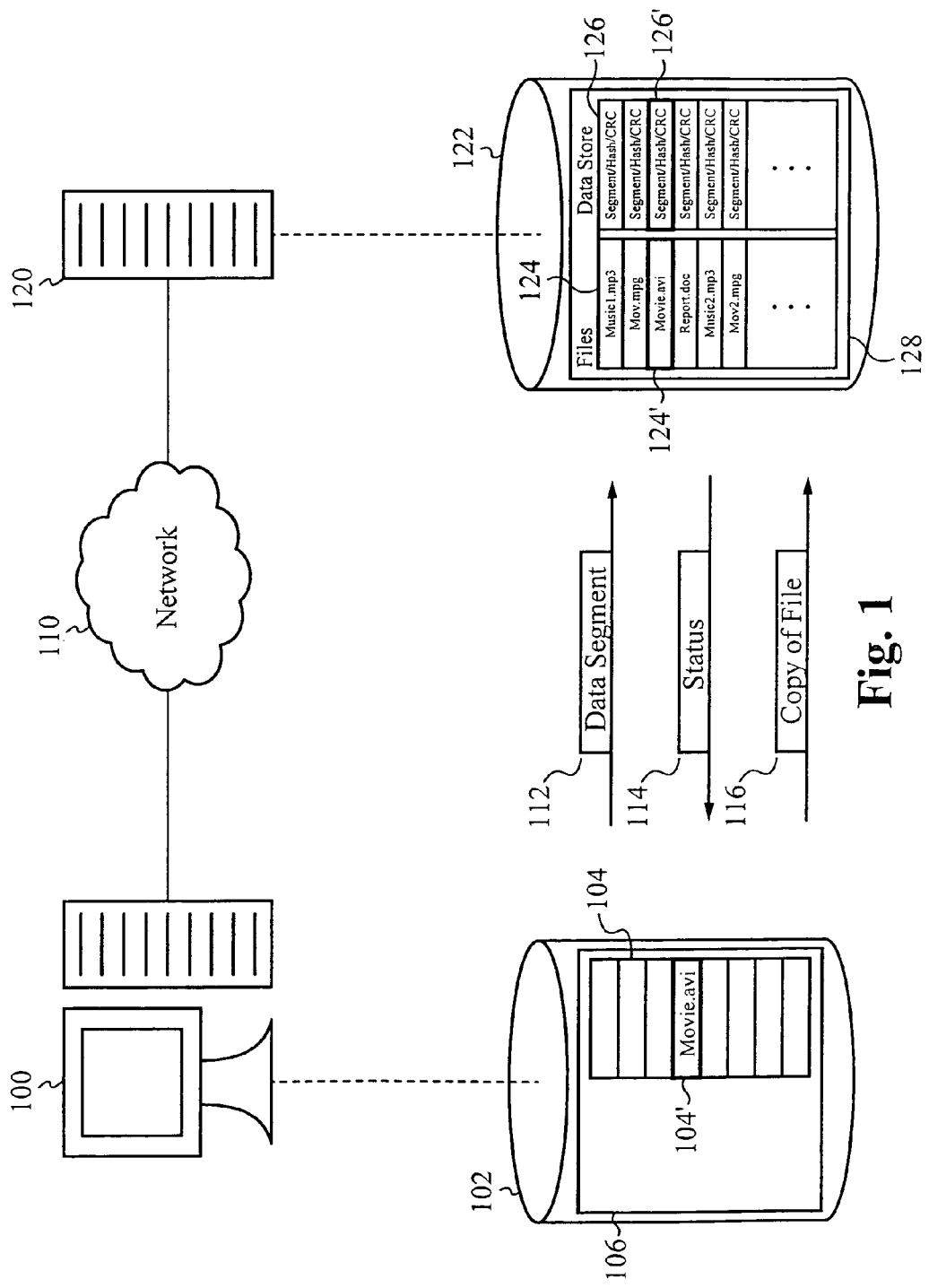
FIG. 1 illustrates a graphical representation of a configuration of an embodiment of the present invention.

FIG. 1 illustrates a graphical representation of a configuration of an embodiment of the present invention. A source computing system 100 is coupled to a target computing system 120 through a network 110. Both the source computing system 100 and the target computing system 120 are able to be any computing system with the ability to transfer data to another system. Such computing systems include but are not limited to, personal computers, laptops, servers, thin clients, cell phones, PDAs, Mac computers, mp3 players and gaming consoles. The network 110 is able to be a Local Area Network (LAN), Wide Area Network (WAN), Metropolitan Area Network (MAN), the Internet, or any other type of network. Although the configuration in FIG. 1 shows the two systems coupled through the network 110, it is possible for the source computing system 100 and the target computing system 120 to be directly coupled to each other. Within the source computing system 100 are standard computing elements including a hard drive 102 where files 104 are stored on a source file system 106. In some embodiments, the hard drive 102 is not a standard hard disk drive but another type of storage system including, but not limited to, a compact disc, a DVD, an optical drive, a network drive or a Redundant Array of Inexpensive Disks (RAID). When a user desires to transfer a file, a source file 104' is selected by the user. For example, a file named, movie.avi, is selected to be transferred. However, unlike past implementations of transferring data, the process does not begin by transferring the entire source file 104'.

After the source file 104' is selected to be transferred, a data segment 112 of the source file 104' is sent across the network 110. In an embodiment, the data segment 112 is a section of the source file 104'. Using the movie.avi example, only a section of the file is sent over the network. In other embodiments, the data segment 112 is a different representation of the data such as a hash or a sliding Cyclic Redundancy Check (CRC) of the source file 104'. In other embodiments, other similar implementations are used where a representation of the source file 104' is sent over the network 110 instead of the entire file. Additionally, representations of parts of the source file 104' are able to be sent.

The target computing system 120 similarly has standard computing components including a hard drive 122. In some embodiments, the hard drive 122 is not a standard hard disk drive but another type of storage system as described above. Within the hard drive 122 is a standard operating system such as Microsoft® Windows XP and a standard file system 128 such as New Technology File System (NTFS) where one or more files 124 are stored. In alternate embodiments, the file system is a non-standard file system. The file system 128 also contains a data store 126. The file system 128 utilizes typical structures such as directories or folders to store the files 124. The data store 126 is an implementation that is able to store data 126' in an organized manner so that it is searchable. In some embodiments, the data store 126 is a database. The data 126' stored within the data store 126 corresponds to the files 124 stored in the file system 128. For example, since a movie.avi file 124' is stored within the hard drive 122, the data store 126 contains data 126' corresponding to movie.avi. The data 126' within the data store 126 depends on the embodiment implemented wherein some embodiments store segments of files, hashes, CRCs, unique database keys and/or other similar implementations of data representation.

The data segment 112 sent from the source computing system 100 is received by the target computing system 120. The target computing system 120 then searches within the data store 126 for a matching data segment. Continuing with the movie.avi example, a matching section of the movie.avi file is searched for within the data store 126. Since the data store 126 contains the movie.avi data 126', a match is found. Hence, the system knows that the movie.avi file already exists on the target computing system 120. The target computing system 120, then sends a status 114 or some form of response to the source computing system 100 indicating that the file is already located at the target computing system 120. In the situation where the source file 104' is already located at the target computing system 120, the source computing system 100 does not need to send any more data, and the target computing system 120 adds a pointer or indicates in some way where the data is located, so that the user copying the data is able to retrieve it later on. If the source file 104' is not located on the target computing system 120, then the status 114 sent back indicates as such. At that point, a copy 116 of the source file 104' is sent from the source computing system 100 to the target computing system 120. Once the new file is received on the target computing system 120, it is stored with the rest of the files 124 and a representation is stored within the data store 126, so that in the future when a user wants to copy that same file, the target computing system 120 will know that it is there and is able to expedite the data transfer by not having to actually transfer the entire file.

Figure 2:
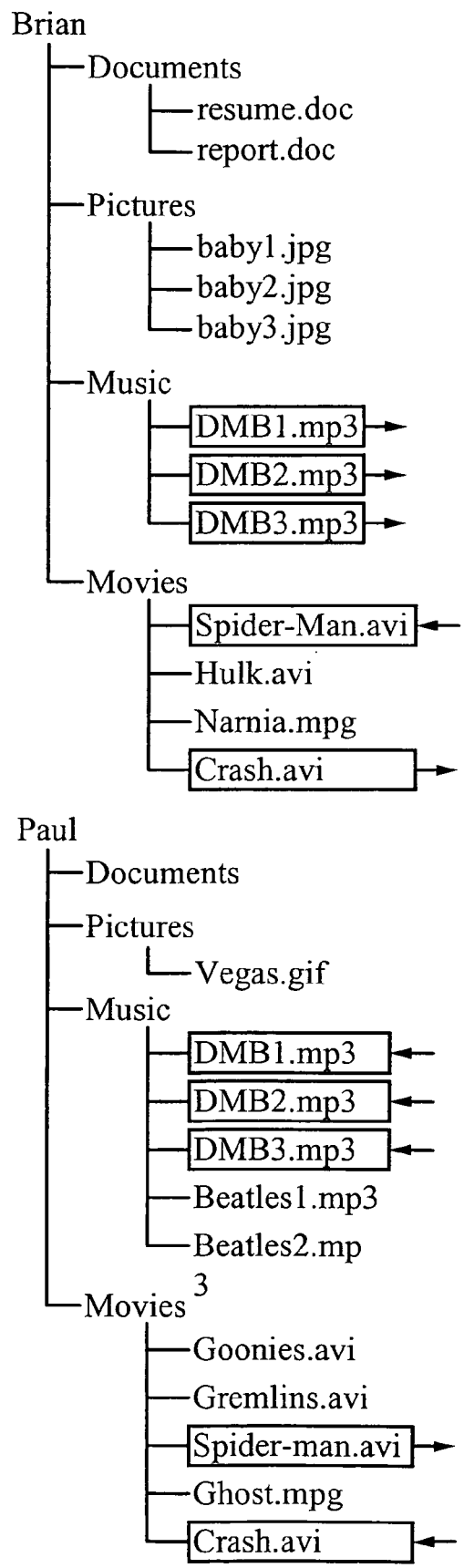
FIG. 2 illustrates an exemplary graphical representation of files and directories stored in a target system in an embodiment of the present invention.

FIG. 2 illustrates an exemplary graphical representation of files and directories stored in a target system in an embodiment of the present invention. Within the example, two users' directories are shown, Brian and Paul. Within each user's storage area, there are four directories: documents, pictures, music and movies, each for storing files related to their respective category. Files that include just the file name within FIG. 2 signify that they are the only file containing that data on the system. For example, Brian's Documents directory contains resume.doc and report.doc which, as expected, are specific to his personal information, so there are no copies of that information found elsewhere on the system. This also means that when Brian transferred these files to the target computing system from his source computing system, the entire files were copied. However, there are types of data where duplicates are commonly found such as music and movies. These common files are the ones that are able to improve network data transfers by not actually copying the entire file and instead linking to the appropriate file already located on the target computing system. Files with a box around them with an arrow pointing outward such as DMB1.mp3, DMB2.mp3 and DMB3.mp3 within Brian's Music directory indicate that those files are actually pointers or links to another file on the system. Here, in Paul's Music directory, he also has DMB1.mp3, DMB2.mp3 and DMB3.mp3 amongst other music files. Paul copied his files before Brian, so his copying included transferring all of the file contents over the network. However, when Brian initiated his transfer, the system found Paul's copies using the methods described herein and instead of transferring the entire files, generated a pointer to Paul's files which are denoted by a box with an arrow pointing inward since they are being linked to. Furthermore, from the user's perspective, the files appear the same, even though there are no actual files with music data stored within Brian's Music directory on the system. The process continues as the users transfer files to the system, and when a file is copied determines whose directory includes the actual data and whose directory includes a pointer to data elsewhere on the system. As shown in FIG. 2, Brian copied Spider-Man.avi and then some time later, Paul did as well. Since Brian made his transfer first, the actual data is stored in his directory.

In some embodiments, the data is not stored in a user's directory, but is stored centrally so that everyone has pointers to the data. This alleviates the issue of one user deleting the file while the other user still wants it to remain. For example if Paul deletes Crash.avi, since the actual movie content is stored in his directory, Brian's pointer would point to nothing if the file is removed from Paul's directory. Using a central storage system where each user points to the central storage, the actual data would not be deleted, just Paul's link to the data, and Brian's link would remain intact. Another embodiment still stores the files in the individual locations, but also keeps track of whom is pointing to the files as well. Therefore, if the user with the actual content deletes it, the file is transferred to another user whose link is pointing to the data. The pointers pointing to the file are reconfigured to point to the data's new location. By transferring the data to another user before the actual data is deleted, this safeguards that the actual data is not lost when other users still want the file.

The above example is not meant to limit the present invention in any way. Although only two users are described, any number of users are able to store data on a system. Furthermore, the number of directories and the directory names are variable as well. The file types are not restricted to those described in the example either; any file types are able to be used. Also, when the files are linked, the filenames do not have to be the same. Comparisons performed by the methods described herein focus on the content of the data not the filenames. Hence, if a filename is Spider-Man.avi on a target and the source filename is Spiderman.avi, but they have the same content, the system is able to recognize they are the same file. The converse is true as well, that just because two files have the same filename, does not mean they have the same content, so links will not incorrectly point to the wrong data as they will not have the same content.

By implementing the present invention, not only are data transfers accelerated, but storage requirements are reduced as well. Using the example in FIG. 2, there are three music files and two movie files that would have been contained as two separate copies in conventional systems. Assuming the music files are 5 MB and the movie files are 1 GB, that is over 2 GB of data being stored in duplicate. Furthermore, since data on network systems are typically backed up, 4 GB of space is being wasted. Using the present invention, where a few bytes are used to point to the data, over 4 GB of space is saved. Furthermore, since this example only shows two users with a small number of files, the space savings on a large system with thousands of users could be extremely large.

Figure 3:
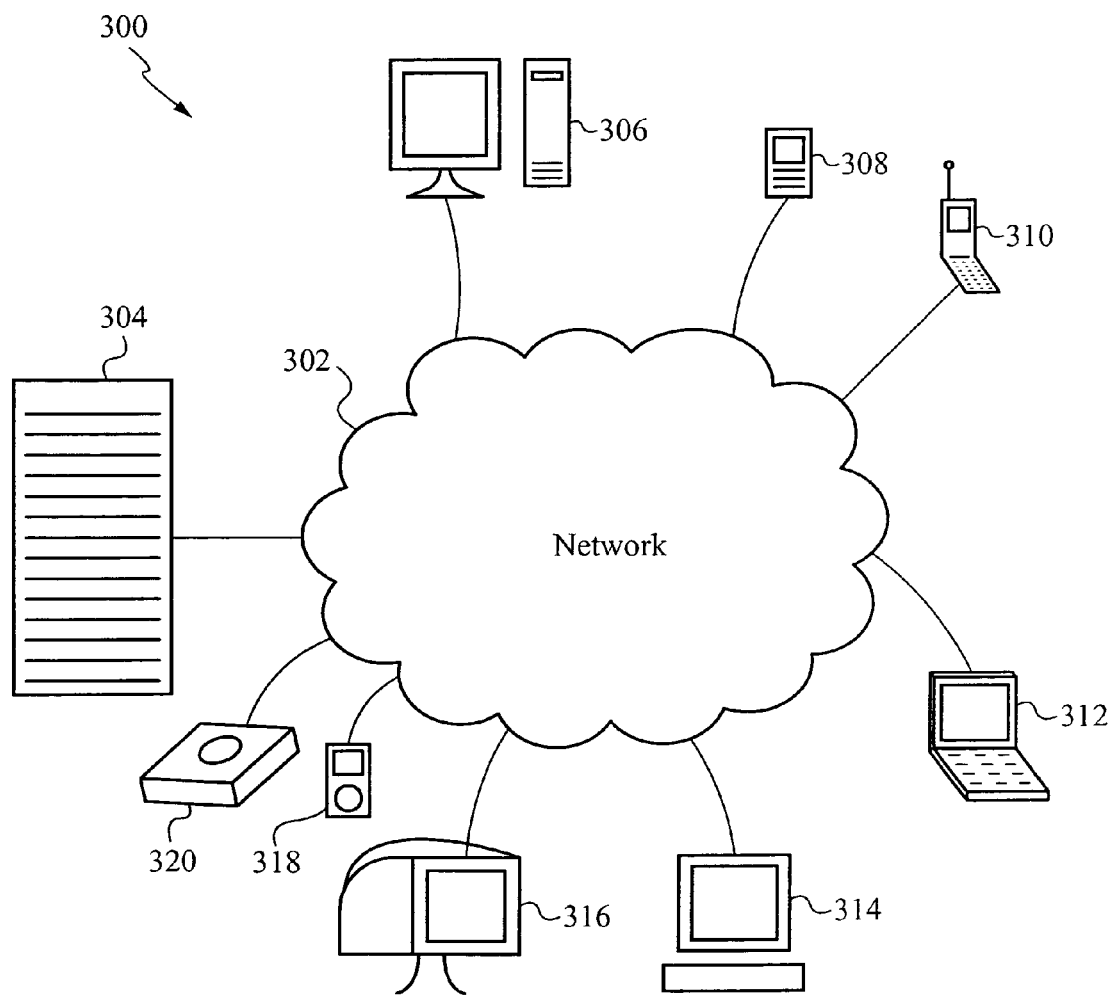
FIG. 3 illustrates a graphical representation of a network of systems configured in the present invention.

FIG. 3 illustrates a graphical representation of a network of systems configured in the present invention. As described above, the present invention includes one or more source computing systems and one or more target computing systems. The source computing system is where the data to be transferred is located, and the target computing system is where the data will be stored after the transfer. Although FIG. 1 illustrates one source computing system and one target computing system, a network of systems 300 is able to include any number of source and target computing systems. FIG. 3 illustrates the computing systems coupled by a network 302. The computing systems include, but are not limited to, a server 304, a personal computer 306, a PDA 308, a cell phone 310, a laptop 312, a thin client 314, a Mac computer 316, an mp3 player 318 and a gaming console 320. Generally, the target computing systems are servers and the source computing systems are personal computers, PDAs, cell phones, laptops, thin clients, Mac computers, mp3 players and gaming consoles. However, any of the systems are able to be either the source or the target.

As an example, a typical configuration for use at a business includes one or more servers 304 as the target systems where users are able to back up their data. The employees then utilize one or more personal computers 306, PDAs 308, cell phones 310 and laptops 312 as the sources for the data. As data is backed up onto the server 304, the accelerated data transfer described herein is utilized. Fewer servers are required because the inefficiencies of duplicated data are resolved. Furthermore, there is less traffic on the network because transfers are much more efficient. Hence, in this setting it is reasonable to have the server be the target computing system and the other systems be the source computing systems.

It is possible though to have the roles of the systems switched or modified. For example, in a home network, a user is able to couple his cell phone, PDA, gaming system and personal computer together where the personal computer is the target system and his cell phone, PDA and gaming system are the source systems.

Figure 4:
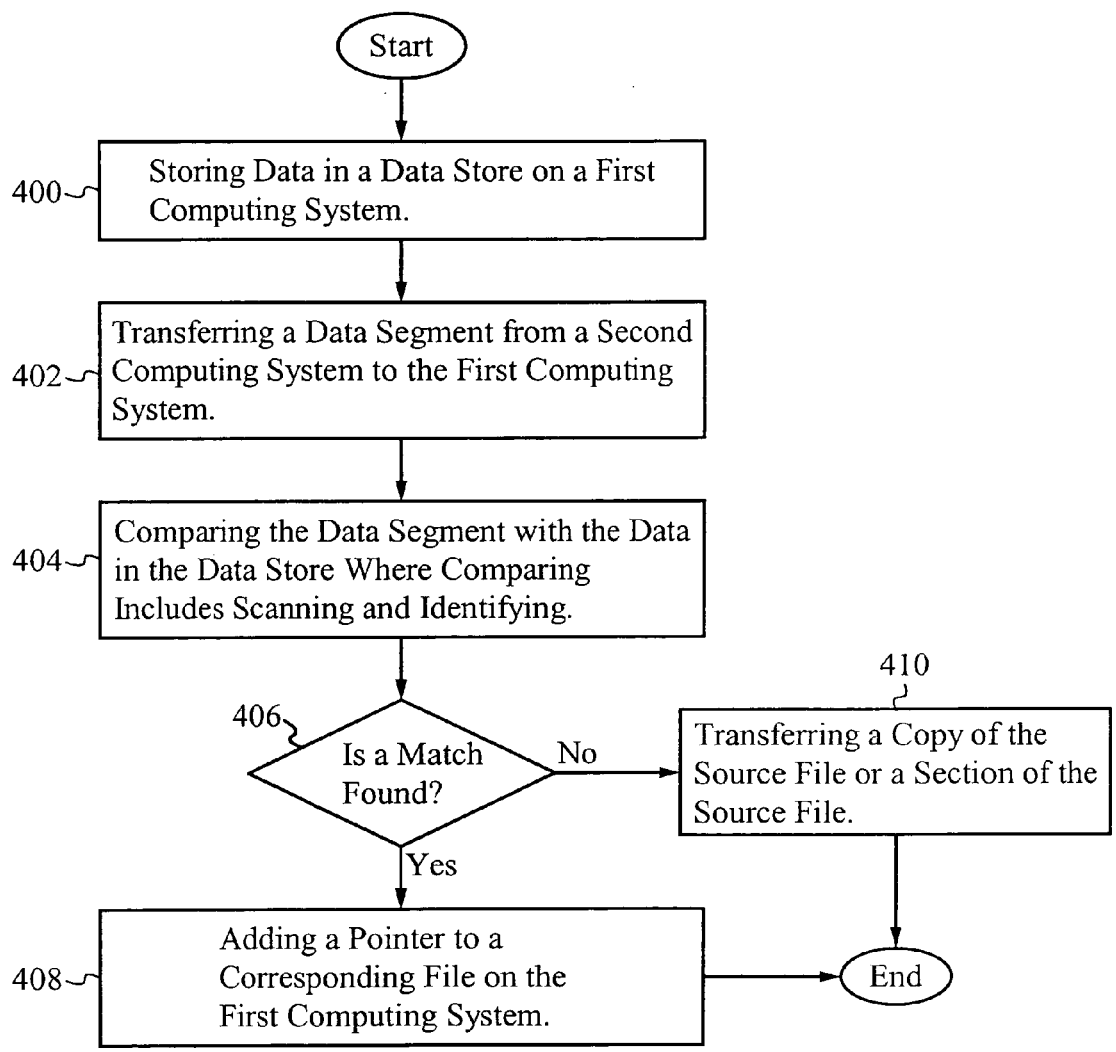
FIG. 4 illustrates a flowchart of an embodiment of the present invention.

FIG. 4 illustrates a flowchart of an embodiment of the present invention. In the step 400, data is stored in a data store on a first computing system also referred to as a target computing system. Additionally, files corresponding to the data stored in the data store are also stored on the first computing system. In the step 402, a data segment is transferred from a second computing system or a source computing system to the first computing system. Generally a user selects a file to be transferred from the second computing system to the first computing system, and the data segment is a part of the file, a hash of the file and/or a CRC of the file. In the step 404, the data segment transferred is compared with the data in the data store. Comparing includes scanning the data store for the data segment and then identifying matching data in the data store. In the step 406, if a match is found then a pointer is generated to point to the corresponding file or files in the step 408. However, if a match is not found in the step 406, then a copy of the source file is transferred from the second computing system to the first computing system.

Although the present invention has been described where a data segment is compared to data, and then a link is generated to point to the entire file corresponding with the data, sections of files are able to be matched as well where the entire file is not the same. For example, sometimes additional data is included at the beginning or end of a music or movie file making the file slightly different from one that has very similar contents. Or, for example, one person has a fifteen second clip of a five minute long video, so the fifteen second clip is contained within the file of the long video. Such sections of data are able to be compared and matched by the present invention using a section of the file or a CRC or hash of a section of the file. In those instances, instead of transferring the entire file across the network because there is some offset or slight difference between the data, the present invention copies the data from the file residing on the target system. The sections of the file that are not already existing on the target system are transferred over the network, and the file is combined to generate the file initially intended to be transferred. In another embodiment, a master file is stored on the target system where the master file contains more data than a smaller file which only contains a portion of the master file. A pointer then points to the correct sections of the master file to represent the smaller file.

To utilize the present invention a user selects a file or files on a source computing system to be transferred over a network to a target computing system. In some embodiments, a user is not required to initiate the data transfer and the transfer is automated. The target computing system performs the necessary search to determine if any common data is already located on the target computing system. If there is common data, then the file is not transferred or only a portion of the file that is not common is transferred, and a pointer points to the common data. When a user views the data on the target computing system, the appearance is no different whether the file was transferred or is pointed to by a pointer. Furthermore, the present invention is able to be utilized without a specially modified file system.

In operation, users experience accelerated data transfers, but otherwise do not have to modify their ways of transferring data. After a user initiates the data transfer, the target computing system receives a data segment representing the file on the source computing system. The target computing system then compares the data segment with data stored within a data store by scanning the data store for a match. If a match is found, then the source file is not actually transferred over the network, and a pointer is generated on the target computing system. If the target computing system does not locate matching data, then the source file is transferred over the network. By expediting transfers of common data, network efficiency increases greatly in addition to storage requirements being reduced.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of accelerating data transfer comprising:
   a. storing data in a data store on a first computing system wherein the data corresponds to one or more files stored on the first computing system;
   b. transferring a data segment from a source file from a second computing system to the first computing system over a network;
   c. scanning the data store on the first computing system for the data segment received from the second computing system;
   d. generating one or more pointers on the first computing system to the one or more corresponding files of one or more matching data segments, if the one or more matching data segments are identified in the data store on the first computing system; and
   e. transferring a copy of the source file from the second computing system to the first computing system, if the one or more matching data segments are not identified in the data store on the first computing system.

2. The method as claimed in claim 1 wherein the data store is a database.

3. The method as claimed in claim 1 wherein the first computing system is a target system and the second computing system is a source system.

4. The method as claimed in claim 1 wherein the first computing system is a server and the second computing system is a client system.

5. The method as claimed in claim 4 wherein the client system is selected from the group consisting of a personal computer, a PDA, a cell phone, a laptop, a thin client, a Mac computer, an mp3 player and a gaming console.

6. The method as claimed in claim 1 wherein the first computing system is a first client system and the second computing system is a second client system.

7. The method as claimed in claim 1 wherein the data segment is one or more cyclic redundancy checks and the data in the data store includes cyclic redundancy checks and the data segment and the data are compared.

8. The method as claimed in claim 1 wherein the data segment is a unique database key and the data in the data store includes database keys and the data segment and the data are compared.

9. The method as claimed in claim 1 wherein the data segment is a hash and the data in the data store includes hashes and the data segment and the data are compared.

10. The method as claimed in claim 1 wherein the data store grows as more files are stored on the first computing system.

11. The method as claimed in claim 1 wherein the files stored on the first computing system are minimized by implementing the data store.

12. The method as claimed in claim 1 wherein one or more additional computing systems are coupled to the first computing system.

13. The method as claimed in claim 1 further comprising transferring only a first section of the source file when only a second section of the source file is found within the data store.

14. The method as claimed in claim 1 wherein a standard operating system and file system are utilized on the first computing system and the second computing system.

15. The method of claim 1 wherein if at least one of the corresponding files of the matching data segments is deleted from a first location on the first computer system where the file was stored, the file is automatically transferred to and stored at a second location on the first computer system where at least one of the one or more pointers were stored as a replacement for the at least one of the one or more pointers.

16. The method of claim 15 wherein the remaining one or more pointers that were not replaced by the file are automatically reconfigured such that the remaining one or more pointers point to the file stored at the second location instead of the first location.

17. A system for accelerating data transfer comprising:
   a. a first computing system having a first memory device for storing one or more files and a data store for storing data corresponding to the one or more files; and
   b. a second computing system having a second memory device, wherein the second computing system is coupled to the first computing system,
   wherein a data segment stored in the second memory device is transferred to the first computing system, and is compared to the data within the data store on the first memory device after being received from the second memory device, further wherein a pointer to the one or more files on the first memory device is added on the first memory device if the data segment is found within the data store on the first memory device, but a copy of a source file corresponding to the data segment is transferred from the second memory device to the first memory device if the data segment is not found in the data store.

18. The system as claimed in claim 17 wherein the data store is a database.

19. The system as claimed in claim 17 wherein the first computing system is a target system and the second computing system is a source system.

20. The system as claimed in claim 17 wherein the first computing system is a server and the second computing system is a client system.

21. The system as claimed in claim 20 wherein the client system is selected from the group consisting of a personal computer, a PDA, a cell phone, a laptop, a thin client, a Mac computer, an mp3 player and a gaming console.

22. The system as claimed in claim 17 wherein the first computing system is a first client system and the second computing system is a second client system.

23. The system as claimed in claim 17 wherein the data segment is one or more cyclic redundancy checks and the data in the data store includes cyclic redundancy checks and the data segment and the data are compared.

24. The system as claimed in claim 17 wherein the data segment is a unique database key and the data in the data store includes database keys and the data segment and the data are compared.

25. The system as claimed in claim 17 wherein the data segment is a hash and the data in the data store includes hashes and the data segment and the data are compared.

26. The system as claimed in claim 17 wherein the data store grows as more files are stored on the first memory device.

27. The system as claimed in claim 17 wherein the files stored on the first memory device are minimized by implementing the data store.

28. The system as claimed in claim 17 further comprising one or more additional computing systems coupled to the first computing system.

29. The system as claimed in claim 17 wherein only a first section of the source file is transferred when only a second section of the source file is found within the data store.

30. The system as claimed in claim 17 wherein a standard operating system and file system are utilized on the first computing system and the second computing system.

31. The system as claimed in claim 17 further comprising a network coupling the first computing system and the second computing system.

32. A network of systems for accelerating data transfers comprising:
   a. one or more source systems having one or more source memory devices for transferring a data segment corresponding to a source file stored on the one or more source memory devices; and
   b. one or more target systems having one or more target memory devices for storing data in a data store corresponding to one or more files on the one or more target memory devices and for comparing the data segment received from the one or more source memory devices with the data in the data store where if the data segment is found, a pointer is generated on the one or more target memory devices to point to a corresponding file in the one or more files on the target memory device instead of transferring the source file over a network, wherein the one or more target systems are coupled to the one or more source systems.

33. The network of systems as claimed in claim 32 wherein the data store is a database.

34. The network of systems as claimed in claim 32 wherein the one or more target systems are one or more servers and the one or more source systems are one or more client systems.

35. The network of systems as claimed in claim 32 wherein the one or more client systems are selected from the group consisting of personal computers, PDAs, cell phones, laptops, thin clients, Mac computers, mp3 players and gaming consoles.

36. The network of systems as claimed in claim 32 wherein the data segment is one or more cyclic redundancy checks and the data in the data store includes cyclic redundancy checks and the data segment and the data are compared.

37. The network of systems as claimed in claim 32 wherein the data segment is a unique database key and the data in the data store includes database keys and the data segment and the data are compared.

38. The network of systems as claimed in claim 32 wherein the data segment is a hash and the data in the data store includes hashes and the data segment and the data are compared.

39. The network of systems as claimed in claim 32 wherein the data store grows as more files are stored on the one or more target memory devices.

40. The network of systems as claimed in claim 32 wherein the files stored on the one or more target memory devices are minimized by implementing the data store.

41. The network of systems as claimed in claim 32 wherein only a first section of the source file is transferred when only a second section of the source file is found within the data store.

42. The network of systems as claimed in claim 32 wherein a standard operating system and file system are utilized on the one or more target systems and the one or more source systems.

43. A storage system configured to receive data from a plurality of source computing systems comprising:
   a memory device comprising:
   a. one or more files;
   b. a set of information corresponding to the one or more files; and
   c. a data store for storing the set of information,
   wherein a data segment received from a source computing system in the plurality of source computing systems is compared with the set of information stored within the data store and a pointer is generated on the storage system to point to a corresponding file in the one or more files if the data segment is found but if the data segment is not found within the data store, a copy of a source file on the source computing system corresponding to the data segment is transferred to the storage system.

44. The storage system as claimed in claim 43 wherein the data store is a database.

45. The storage system as claimed in claim 43 wherein the data segment is one or more cyclic redundancy checks and the set of information in the data store includes cyclic redundancy checks and the data segment and the set of information are compared.

46. The storage system as claimed in claim 43 wherein the data segment is a unique database key and the set of information in the data store includes database keys and the data segment and the set of information are compared.

47. The storage system as claimed in claim 43 wherein the data segment is a hash and the set of information in the data store includes hashes and the data segment and the set of information are compared.

48. The storage system as claimed in claim 43 wherein the data store grows as more files are stored on the storage system.

49. The storage system as claimed in claim 43 wherein the files stored on the storage system are minimized by implementing the data store.

50. The storage system as claimed in claim 43 wherein only a first section of the source file is transferred when only a second section of the source file is found within the data store.

51. The storage system as claimed in claim 43 wherein a standard operating system and file system are utilized on the storage system.

52. A method of accelerating data transfer comprising:
   a. storing data in a data store on a target computing system wherein the data corresponds to one or more files stored on the target computing system;
   b. transferring a data segment of a source file from a source computing system to the target computing system over a network in response to a request for the source file by the first computing system;
   c. scanning the data store on the target computing system for the data segment received from the source computing system;
   d. generating a pointer on the target computing system that points to at least one of the one or more files, if the data that corresponds to the at least one of the one or more files matches the data segment; and
   e. transferring a copy of the source file from the source computing system to the target computing system, if the data that corresponds to the one or more files does not match the data segment.

* * * * *